United States Patent [19]

Yeh

[11] Patent Number: 5,003,741
[45] Date of Patent: Apr. 2, 1991

[54] STRUCTURE OF MULTI-FUNCTION FRAME MEMBERS

[76] Inventor: Kuo-Huei Yeh, 70, Lane 184, Hu-Lin St., Taipei, Taiwan

[21] Appl. No.: 208,599

[22] Filed: Jun. 20, 1988

[51] Int. Cl.⁵ .............................................. E04B 1/343
[52] U.S. Cl. ...................................... 52/280; 52/282; 52/656; 312/265.1; 312/140; 403/295; 403/298
[58] Field of Search ............. 312/257 SK, 257 R, 140, 312/257 SM, 257 A, 257.1, 265.1; 108/111, 153; 403/295, 298, 176; 52/656, 721, 280, 282

[56] References Cited

U.S. PATENT DOCUMENTS

| | | | |
|---|---|---|---|
| 3,532,369 | 10/1970 | Reilly | 403/176 |
| 3,632,147 | 1/1972 | Finger | 403/176 |
| 3,645,569 | 2/1972 | Reilly | 403/295 |
| 3,666,298 | 5/1972 | Reilly | 403/176 |
| 3,921,360 | 11/1975 | Baldwin | 403/176 |
| 4,194,338 | 3/1980 | Trafton | 52/721 |
| 4,490,064 | 12/1984 | Ducharme | 403/298 |
| 4,556,148 | 12/1985 | Koller | 312/140 |
| 4,683,634 | 8/1987 | Cole | 403/295 |
| 4,768,845 | 9/1988 | Yeh | 312/257 SK |

FOREIGN PATENT DOCUMENTS

| | | | |
|---|---|---|---|
| 2856443 | 7/1980 | Fed. Rep. of Germany | 312/140 |
| 1496182 | 9/1967 | France | 403/298 |
| 1266283 | 3/1972 | United Kingdom | 403/295 |

Primary Examiner—Kenneth J. Dorner
Assistant Examiner—Brian K. Green
Attorney, Agent, or Firm—Fleit, Jacobson, Cohn, Price, Holman & Stern

[57] ABSTRACT

A multi-purpose frame structure has basic frame members consisting on the one hand of an octagonal tube and on the other hand of a connector. The octagonal tube is provided on its outer sides with dovetail slots and on its inside with opposed longitudinal engaging surfaces. The connector is in the form of a support with orthogonally disposed legs that can be received in the octagonal tube, each leg having a series of transverse projections which engage the surface projections inside of the tube. A frame may be made up from a number of the tubes and connectors and numerous other fittings may be provided which fit in the dovetail slots.

12 Claims, 17 Drawing Sheets

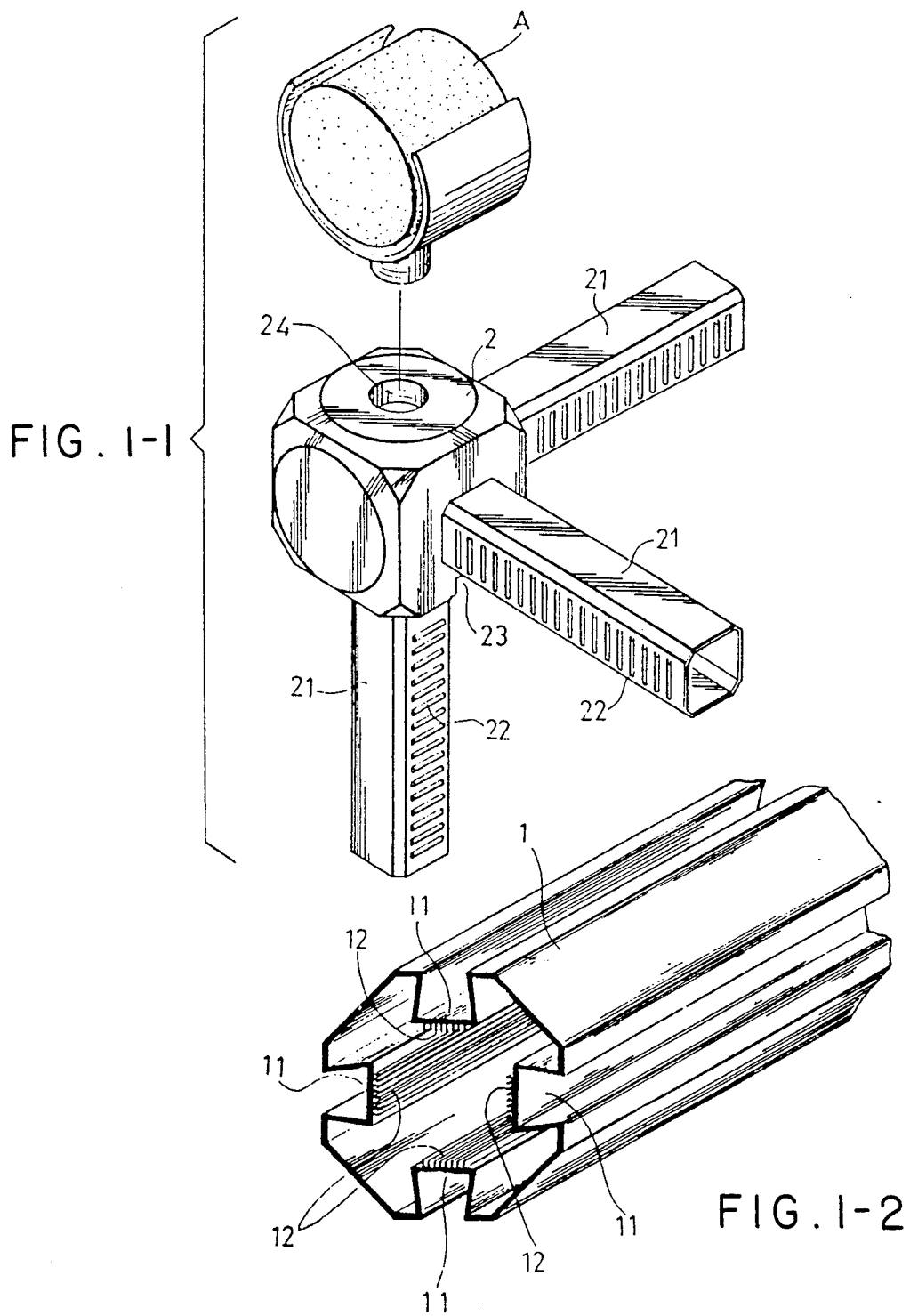

STRUCTURE OF MULTI-FUNCTION FRAME MEMBERS

BACKGROUND OF THE INVENTION

The present invention relates to a structure of multi-function frame members and particularly to a structure including a frame portion and a connector portion with special configurations to be combined into the furniture with any style and specifications as required by the user so as to achieve the purpose of economy and practice.

The conventional furniture products are made by the furniture shops or by the technical personnel in line with the buyer's order or appointment. This not only confines the styles and specifications which are difficult to meet with the user's demands, but also leads to high cost which is not economical because of the involvement of manual labor. In other words, so far as the said products are concerned, as a rule, the user has to adapt himself or herself to these products; otherwise, the user has to spend more money to make these products to meet with his or her demands. In addition, the higher cost of manual techniques for manufacturing these products leads to a higher price which is uneconomical.

The present invention is designed to eliminate the foregoing drawbacks and offer a structure of multi-function frame members which can be made into the products with the styles and dimensions required by and adapted to the user so as to achieve the purpose of economy and practice.

SUMMARY OF THE INVENTION

A structure of multi-function frame members of the present invention consists of a frame portion and a connector portion wherein the frame portion is a sectional octagonal tube thereon the four symmetrical surfaces have inwardly recessed dovetail slots toward the tube, a plurality of long convex strips are on the bottom edge of said slot to form four clamping walls in the shape of a claw in keeping with the projecting sectional octagonal inserting legs on the peripheral edge of octagonal sphere of the connector portion. The convex strips on the two sides of said inserting legs and the convex strips on the said clamping walls, are in a mutually perpendicular state, so these inserting legs may be inserted in the clamping walls to achieve the combination of the frame portion and the connector portion, then making use of the said configurations or in keeping with the demand for actual use to modify the inserting grooves of the frame portion and the inserting legs of the connector portion and using some accessory members, one may combine the required furniture and appliances as one likes in need of no appointing the technical personnel for special manufacturing, and the combined furniture and appliances are characterized by economy, convenience and practicability with excellent efficiency.

Concretely speaking, the primary object of the present invention is to offer a structure of multi-function frame members, wherein the frame portion and the connector portion can be easily combined through the four claw-shaped clamping walls in the octagonal tube of said frame portion and the projecting octagonal inserting legs on the peripheral surface of the octagonal sphere, a plurality of convex strips are provided to the said walls and the two sides of said legs so that when these legs engage with these walls, all the convex strips intersect each other vertically one by one, then making use of such a combination and the inserting legs of connector portion, frames with various types and sizes can be easily assembled, and inserting the partition plates in the recessed dovetail slots on the symmetrical surfaces of the octagonal tube of the frame portion can form a cabinet quite conveniently and effectively.

Another object of the present invention is to offer a structure of multi-function frame members wherein the recessed dovetail slots on the octagonal tube of the frame portion may be in keeping with the required device, and some inserting slots may be provided to the tube surface between two adjacent dovetail slots in favor of engaging with other accessory members so as to enhance the utilization and multiple function of the present invention.

Still another object of the present invention is to offer a structure of multi-function frame members wherein the projecting octagonal inserting legs on the peripheral edges of the octagonal sphere of the connector portion are used to assemble some frames in keeping with the octagonal tube to connect the frame portion and may be a number of shapes such as L-shaped, T-shaped and cross-shaped, and some inserting holes or threaded apertures may be provided to the surface of the octagonal sphere without requiring the said legs to install other accessory members so as to make the present invention considerably practical.

BRIEF DESCRIPTION OF THE DRAWINGS

FIG. 1-1 is an exploded elevational view of basic frame members of the present invention.

FIG. 1-2 is a fragmentary perspective view of a frame member in the form of an octagonal tube FIGS. 2-1, 2-2 and 2-3 show cross-sectional views of octagonal tubes according to other embodiments of the present invention.

FIGS. 3-1 to 3-6 show three-dimensional views of connector portions of the present invention.

FIG. 4 is a three-dimensional view of frame members of the present invention for a support case.

FIG. 5-1 section along the lines indicated in FIG. 5-2 which is a three-dimensional view of a case having sliding doors.

FIGS. 6-1 and 6-2 are views of frame members of a present for the lamp shade.

FIGS. 7-1 and 7-2 are views of frame members of the present invention for installing marking plates.

FIGS. 8-1 and 8-2 are views of frame members of the present invention for installing a bookcase.

FIGS. 9-1 and 9-2 are views of frame members of the present for a partition in a case.

FIGS. 10-1 and 10-2 are views of frame members of the present for installing a drawer.

FIGS. 11-1 and 11-2 are views of accessory members of FIGS. 10-1 and 10-2 of the present invention for a network.

FIGS. 13-1 and 13-2 are views of frame members of the present invention for installing a network by means of hanging hooks FIGS. 14-1 and 14-2 are views of frame members of the present in for the combination of cabinets.

FIGS. 15-1 and 15-2 are views of frame members of the present invention for installing same on a wall.

FIGS. 17-1 and 17-3 are views of frame members of the present invention for installing partition plates of a cabinet.

DETAILED DESCRIPTION

Figures 1, 2:
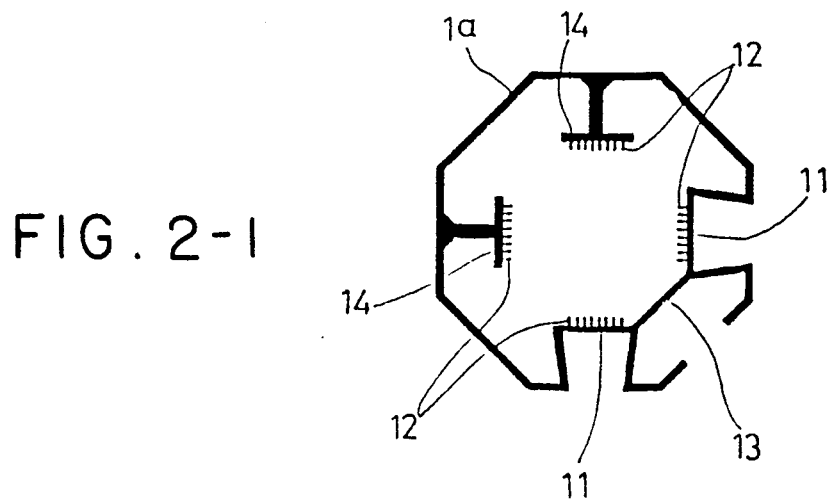
Figure 2:
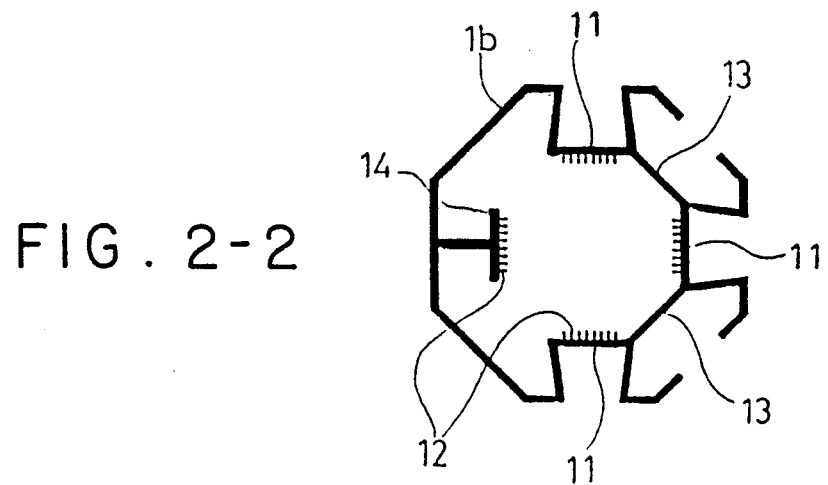

The purpose and functions of some preferred embodiments of the structure of the present invention are best described in conjunction with the accompanying drawings:

FIG. 1 shows a tube(1) of a frame portion and an octagonal sphere(2) of a connector, wherein the section of said tube(1) is also octagonal, each of the four symmetrical surfaces has an inwardly recessed dovetail slot(11), a plurality of long convex strips(12) at the bottom edge of said slot(11) to form a four claw-shaped clamping wall in the tube(1) in keeping with the projecting octagonal inserting legs(21) on the peripheral surface of said octagonal sphere(2), and the same convex strips(22) are provided to the two sides of said inserting legs(21). When inserting to engage with the clamping walls of said tube(1), the two convex strips(12)(22) are in a perpendicular state, so the frame portion and the connector portion can be easily and stably engaged with each other.

In addition, rectangular cutaway recess(23) on the octagonal sphere(2) at the upper and lower ends of said leg(21) is designed to let the connector portion pass through when inserting the tube(1) to install a power source conducting wire. An inserting hole or threaded aperture(24) may be provided to the side of the peripheral edge of the octagonal sphere(2) without the inserting leg(21) in line with the demand for the position of the frame upon assembly to engage with the accessory members such as the pad and support of the frame. For instance, a pulley seat(A) may be installed therein by means of threaded engagement to displace and slide the assembled frame from time to time. Certainly a frame leg pad may be combined through threaded engagement to make it secure, and this may be done quite conveniently.

What is mentioned above is a basic pattern of the configuration of frame portion and connector portion of the present invention which may be modified for factual application. As shown in FIG. 2, the several modified styles of tube(1) of frame portion may be in keeping with the position of said tube(1) to determine how to use the same. For instance, the central tube(1a) may be provided to the outer side of the frame for inserting a partition plate by means of the adjacent perpendicular dovetail slot(11), and an inserting groove(13) may be provided to the outer edge of said central tube(1a) there-between so as to be used for inserting other accessory members. A top clamping surface(14) and a plurality of long convex strips(12) slot(11) toward the interior of said central tube(1a) if in need of not providing the same dovetail slot(11) therein so as to form four claw-shaped walls in the tube(1a) at the bottom edge of said dovetail slot(11) and also to engage with the inserting legs(21) of the connector. Even an inserting groove(13) is provided, the clamping walls adjacent to the bottom edge of said groove(13) will not hinder the insertion of octagonal inserting legs(21) and have the same action.

The tube(1b) has a tri-directional dovetail slot(11) for inserting the partition plate and two inserting grooves (13), the four claw-shaped clamping walls at the central part of tube(1b) also may be engaged with the inserting leg(21) of the connector. In addition, the tube(1c) has quadri-directional dovetail slot(11) and four inserting grooves(13) between each two adjacent slots(11) and can engage with the connector portion.

Figures 2, 3:
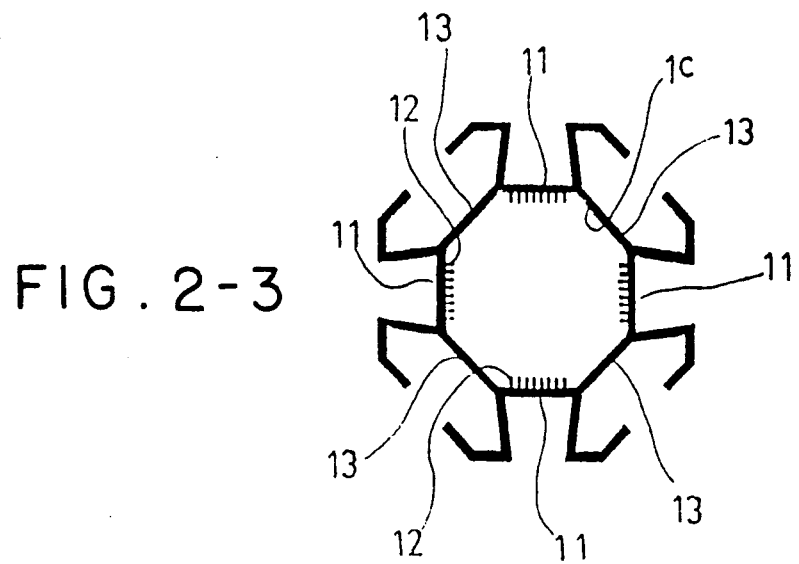
Figures 1, 3:
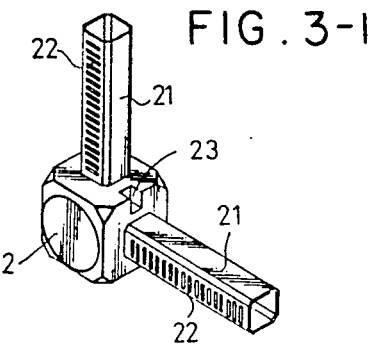
Figures 2, 3:
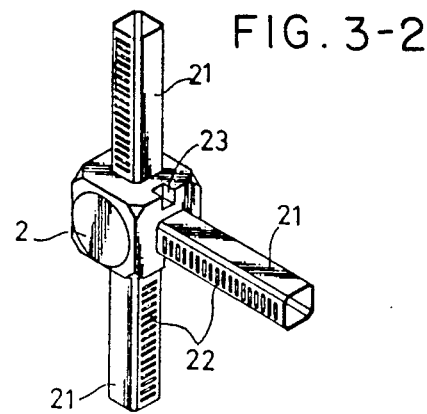
Figure 3:
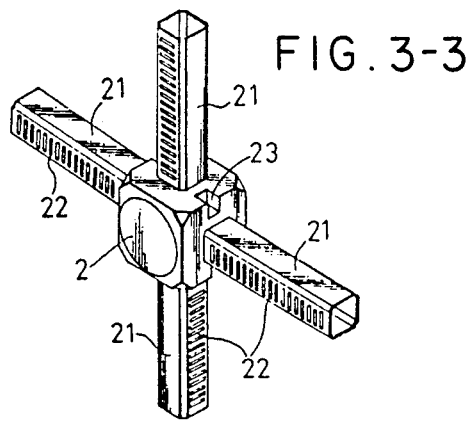
Figures 3, 4:
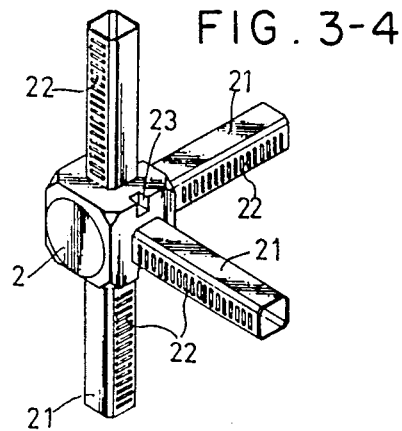
Figures 3, 4, 5:
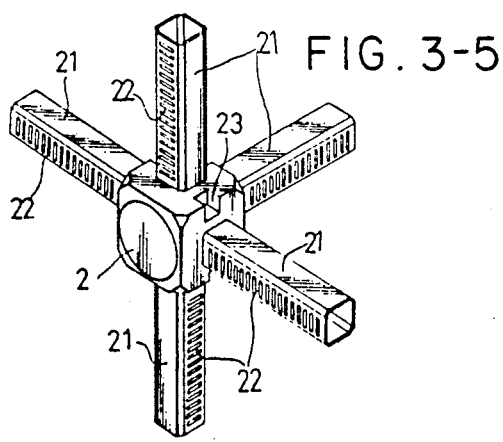

As shown in FIG. 3, the modified inserting legs(21) of octagonal sphere(2) of connector portion are designed to engage with the connector of a frame and to provide the frame tube with the inserting legs(21) to form a secure frame and may be L-shaped, T-shaped, cross-shaped and forked. Making use of the foregoing the basic patterns of the tube(1) of the frame portion and the octagonal sphere (2) of the connector portion, together with other modified types, can constitute various frames with different types and dimensions in line with the requirements for usage, and the required products can be completed in keeping with other accessory members quite conveniently. Some embodiments are hereby described as follows:

As shown in FIG. 4, the tube(1) of the present invention may be used as a support in keeping with hanging hooks(31) for wire netting(B) which may be securely fixed onto the said support for disposing some products for display; and the inserting legs(21) of the octagonal sphere(2) of the connector portion may be directly used to make a case(C), namely, to make use of the dovetail slot(11) to insert the partition plate(32) between the frame tube(1) and connector sphere(2) can form a case without using any screws or tools, and the dimensions and types thereof may be modified as one likes, it is quite convenient. If a sliding door is to be installed at the front end of said case(C), all that is required to insert the upper and lower sliding door rails(33)(34) by making use of the dovetail slots(11) of upper and lower tubes(1) at the front end of said case(C), and then to insert the sliding door(35) in the said rails(33)(34) as shown in FIG. 5.

Figures 3, 4, 5, 6:
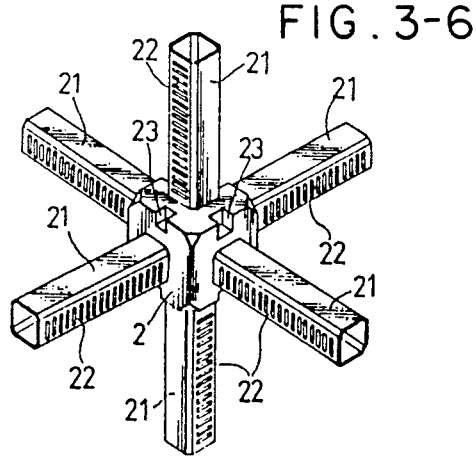
Figure 4:
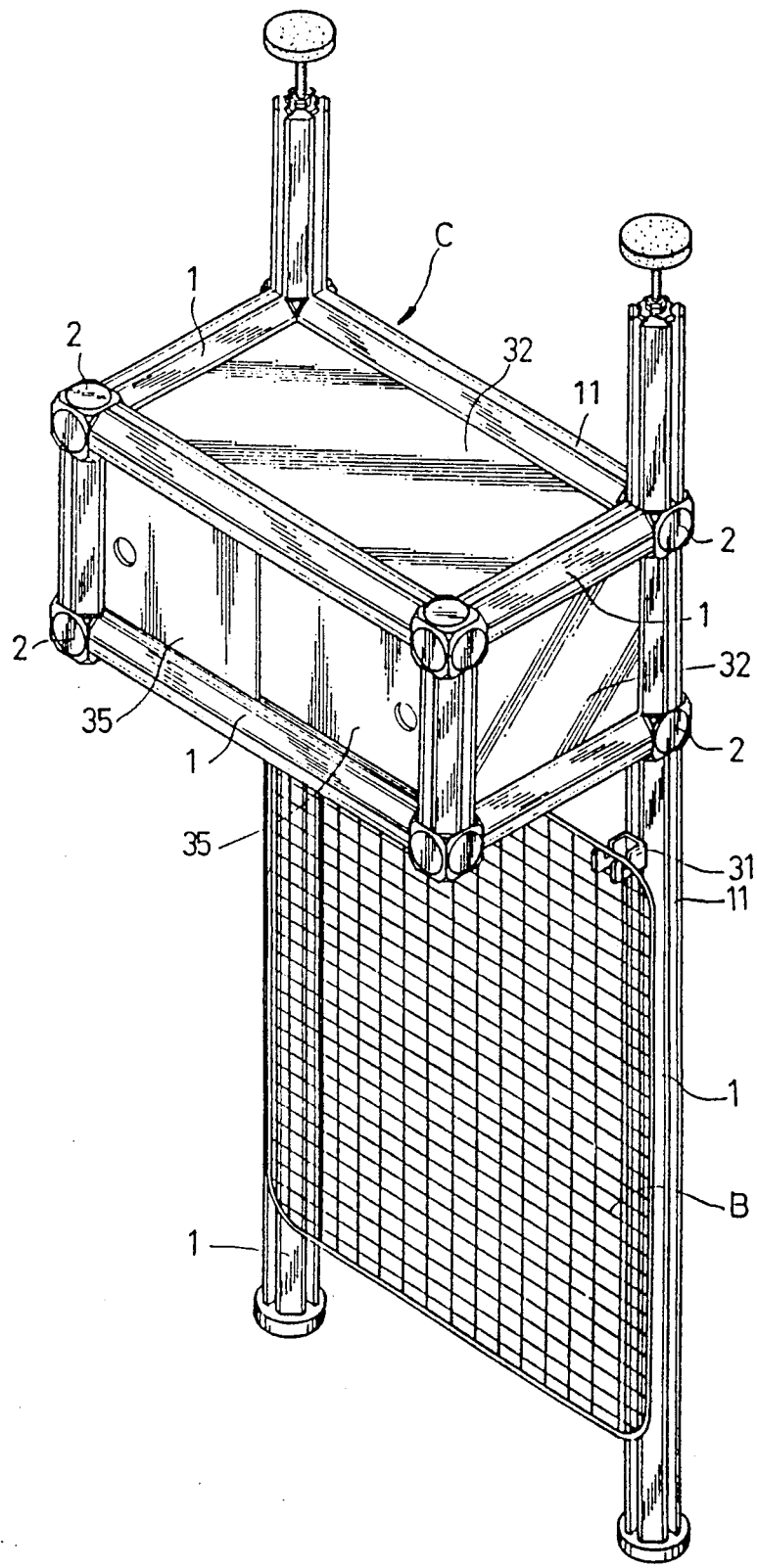
Figures 1, 5:
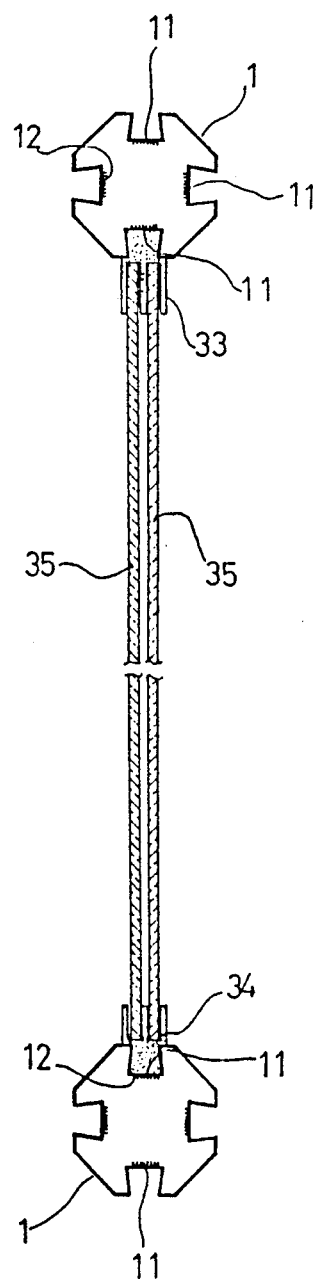
Figures 2, 5:
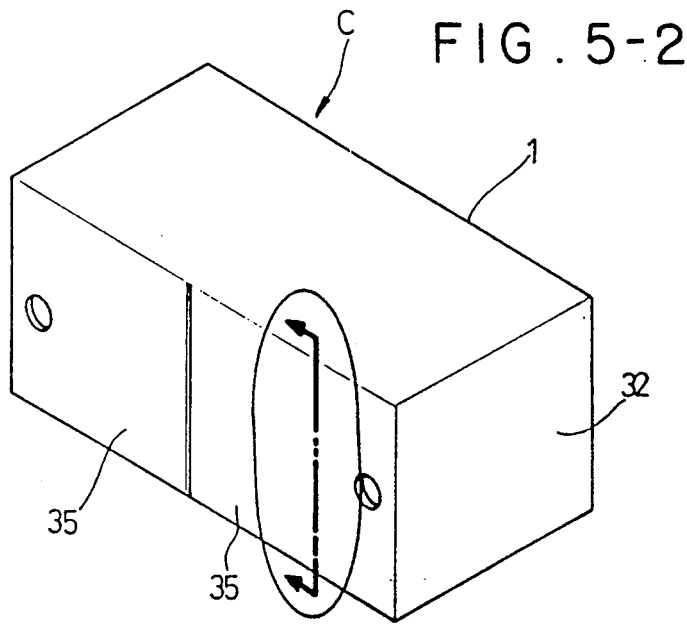
Figures 1, 6:
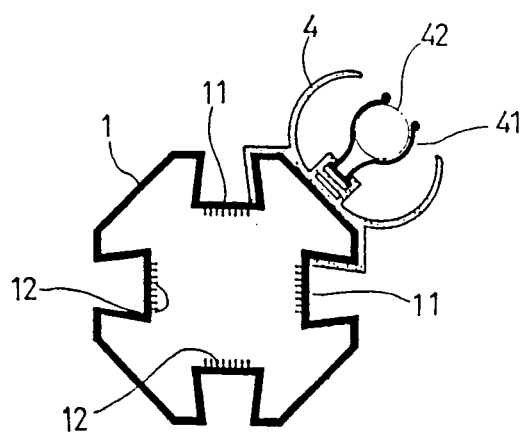
Figures 2, 6:
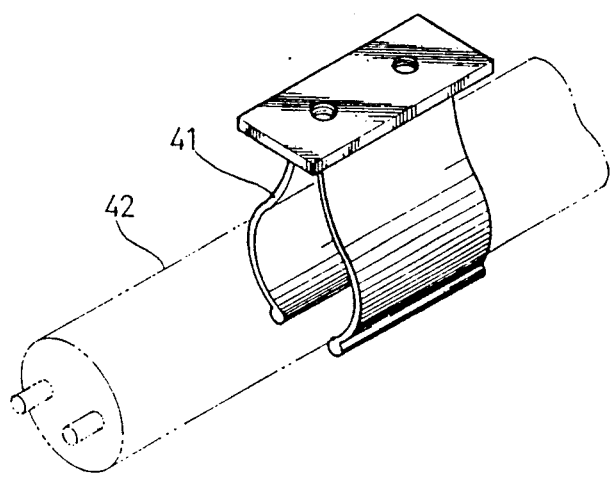

As shown in FIG. 6, a lamp shade(4) may be installed in the position between the adjacent two dovetail slots (11) of tube(1), and a clamping member(41) may be inserted into the lamp shade(4) to clamp the lamp tube(42) so as to keep the stability of the structure as a whole.

Figures 1, 7:
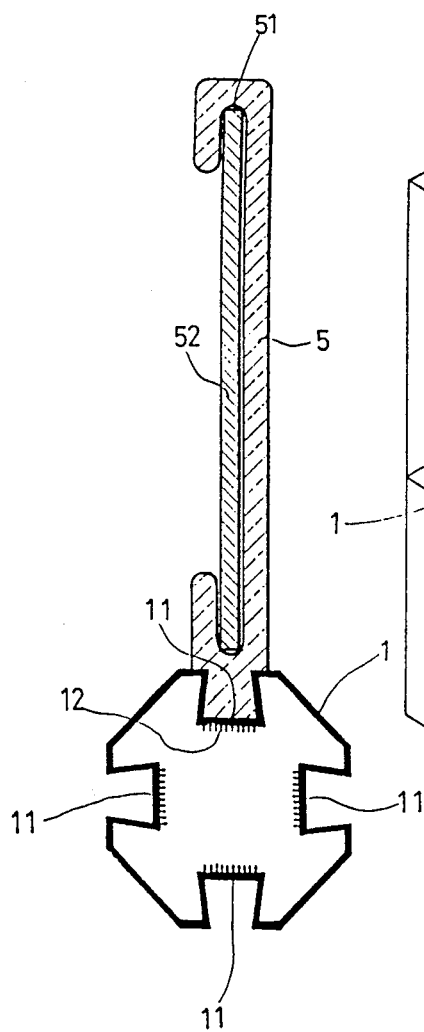
Figures 2, 7:
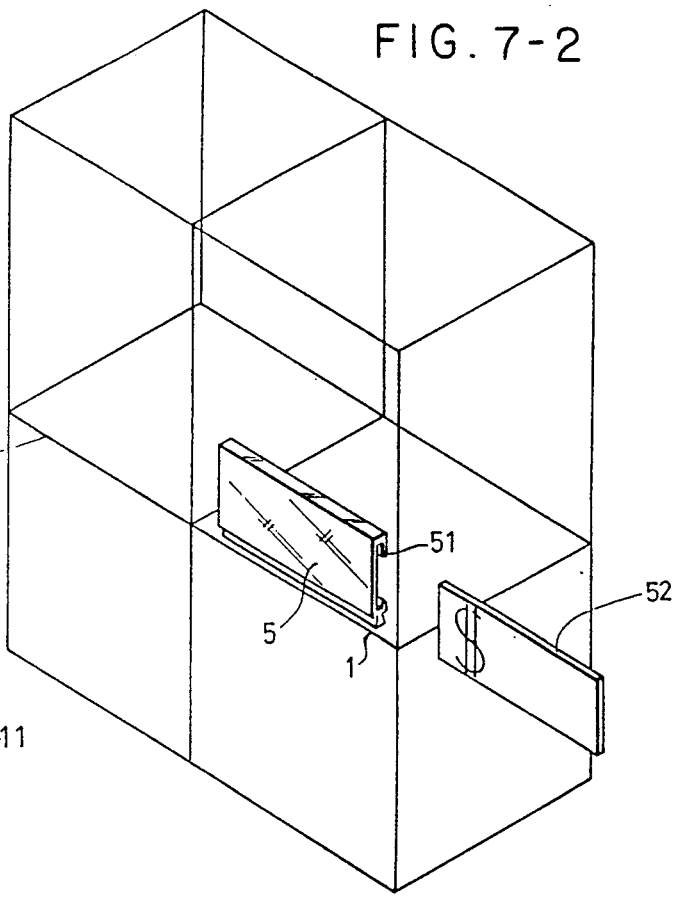

As shown in FIG. 7, a marking plate(5) with a dovetail base may be inserted in the dovetail slot(11) of tube(1), and some plates(52) showing price and trade name may be disposed in the inserting groove(51) of said marking plate(5), and it is very convenient to use and replace these plates(52).

Figures 1, 8:
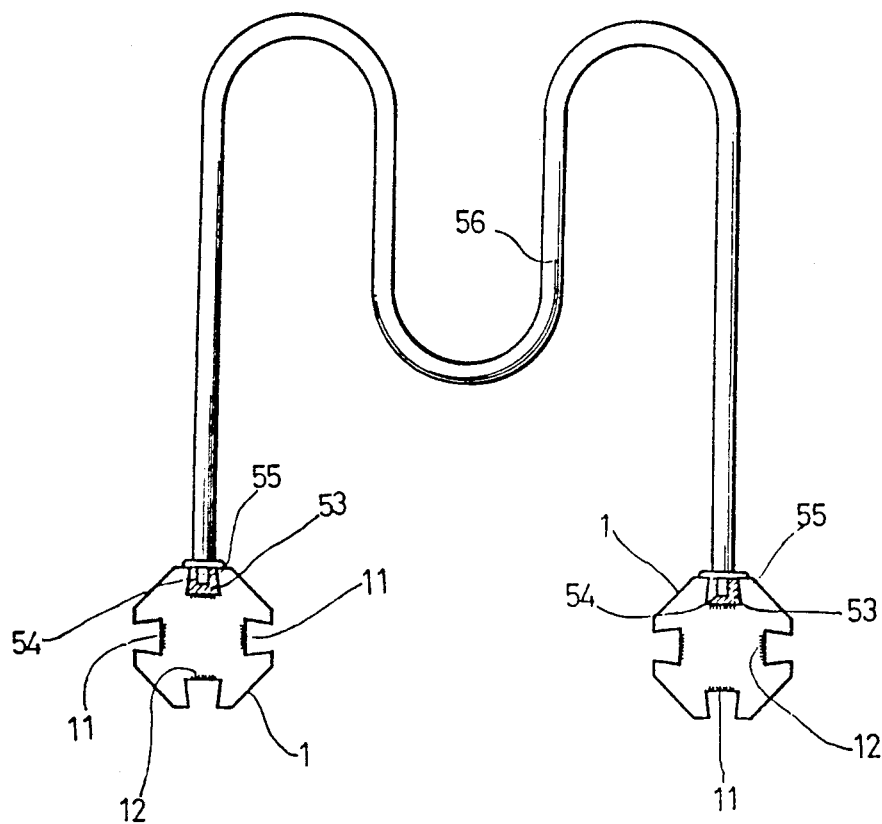
Figures 2, 8:
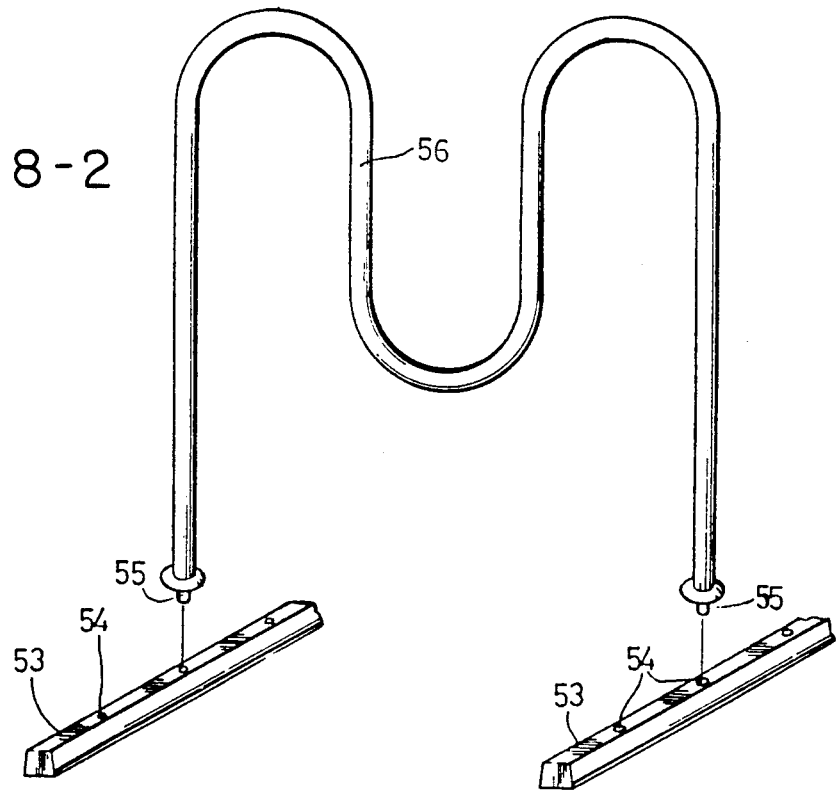

Similarly, an inserting seat(53) with a section of dovetail shape may be inserted in the dovetail slot(11) of tube(1), the inserting holes(54) on the said seat(53) may be used to dispose the frame(56) with convex post(55) to form a bookcase as shown in FIG. 8.

Figures 2, 9:
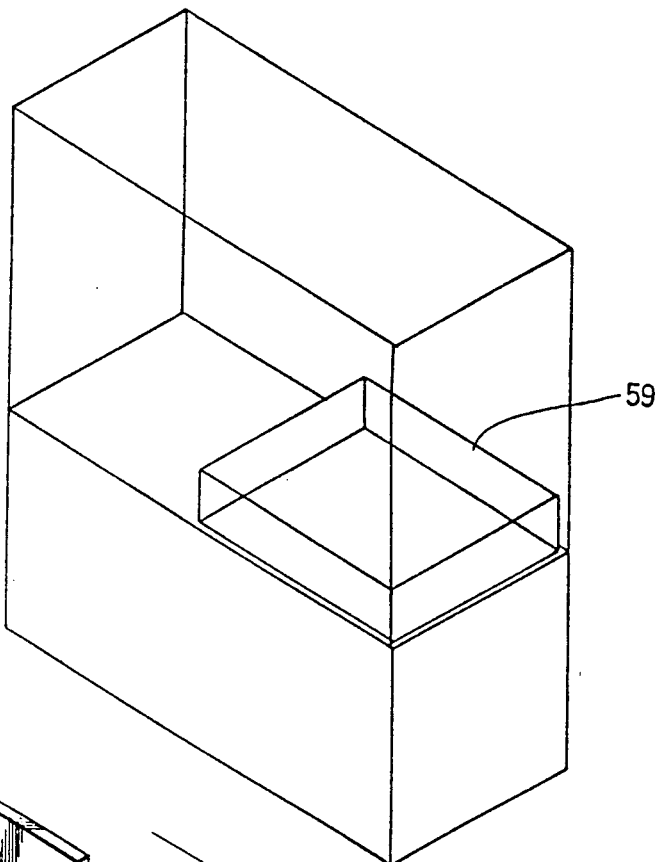
Figures 1, 9:
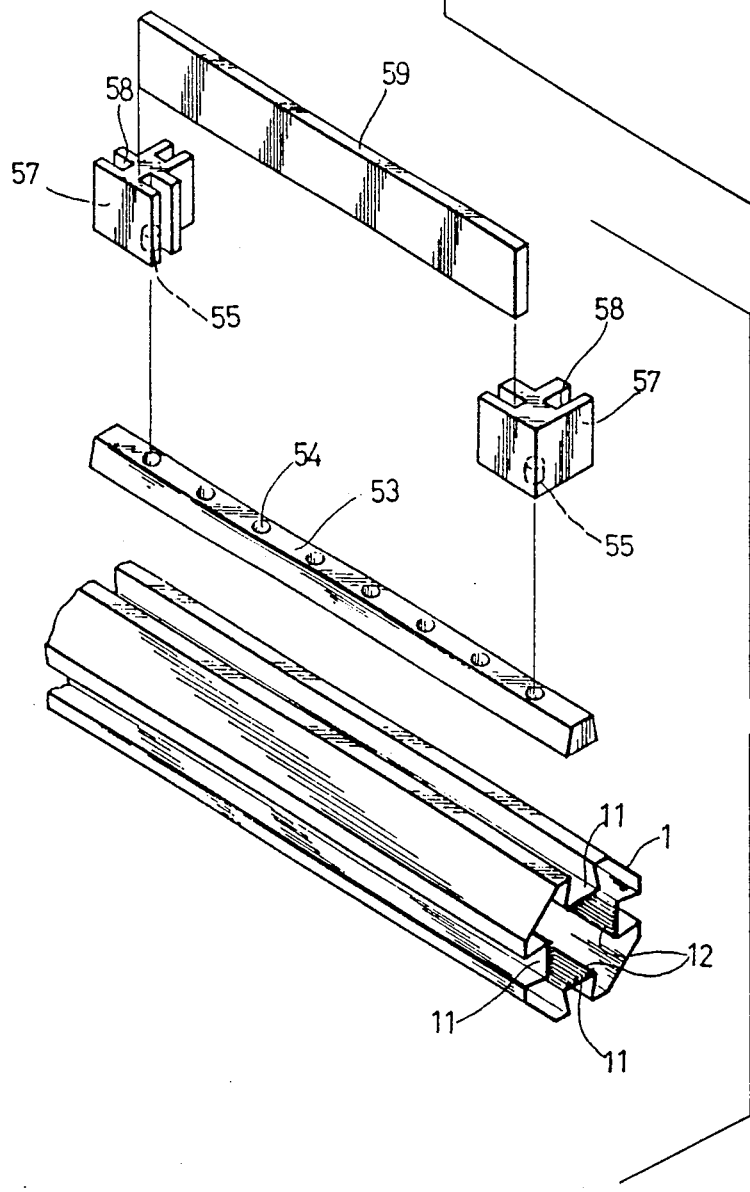

The clamping seat(57) with same convex post(55) may also be engaged with the inserting seat(53) and the partition plate(59) may be inserted in the slot(58) so as to compartmentalize the case, cabinet and frame as shown in FIG. 9 to dispose small articles.

Figures 1, 10:
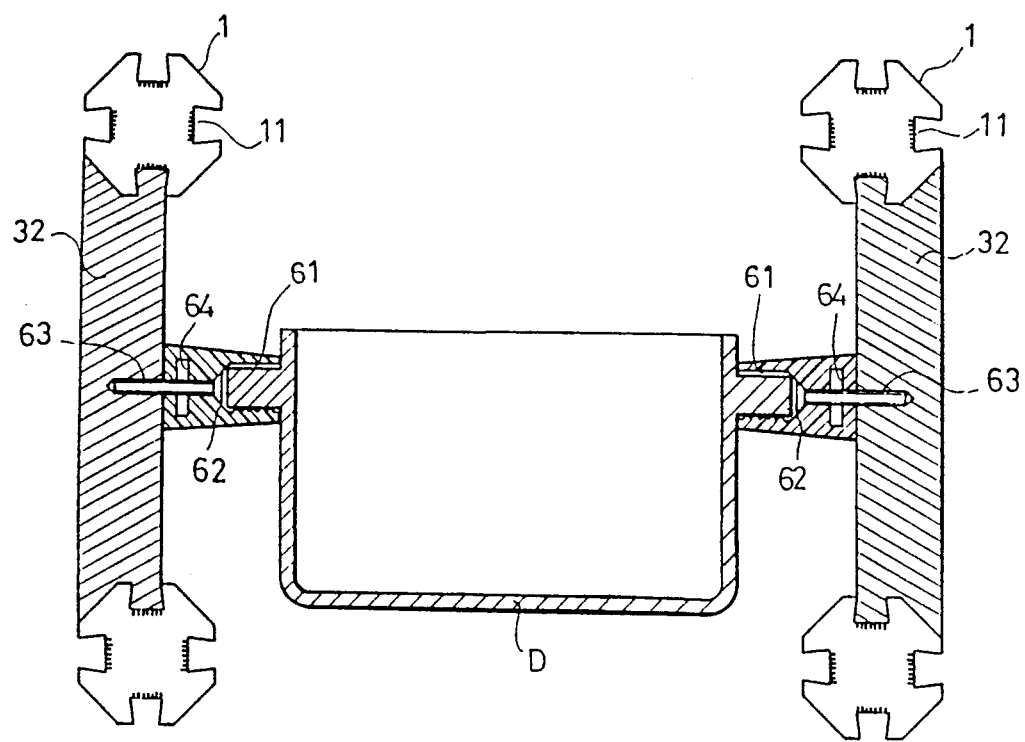
Figures 2, 10:
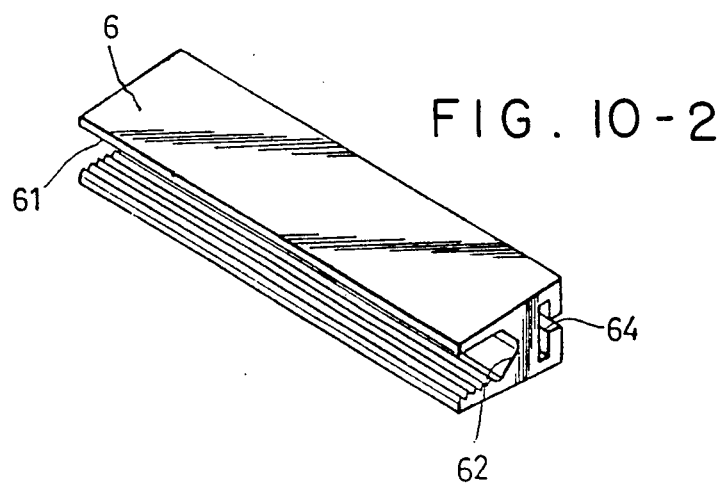
Figures 1, 11:
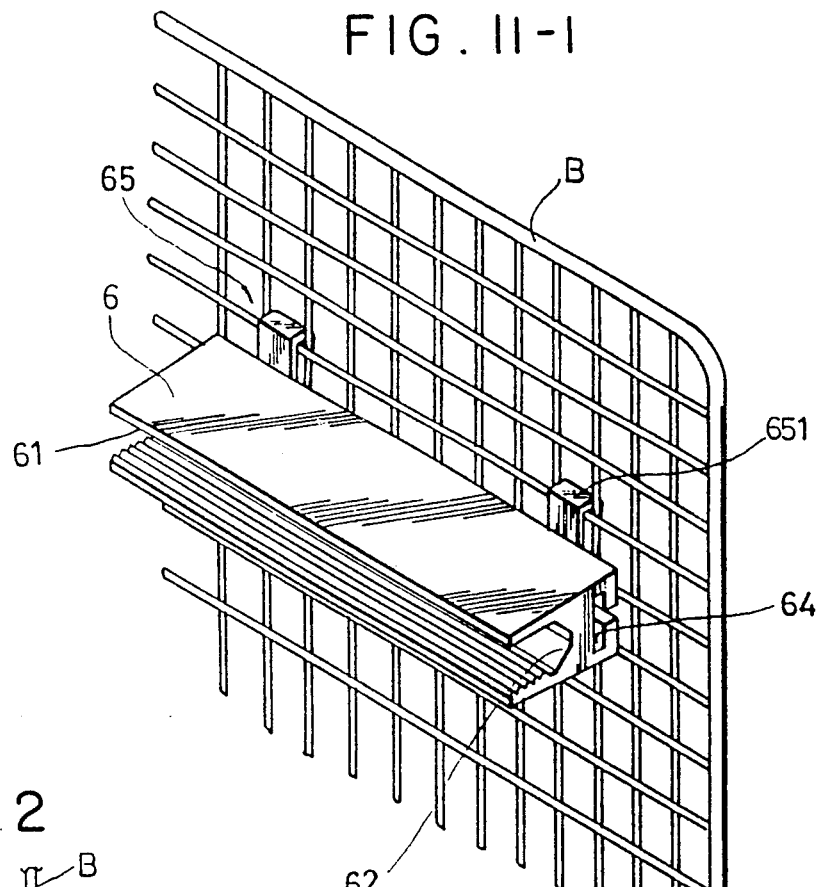
Figures 2, 11:
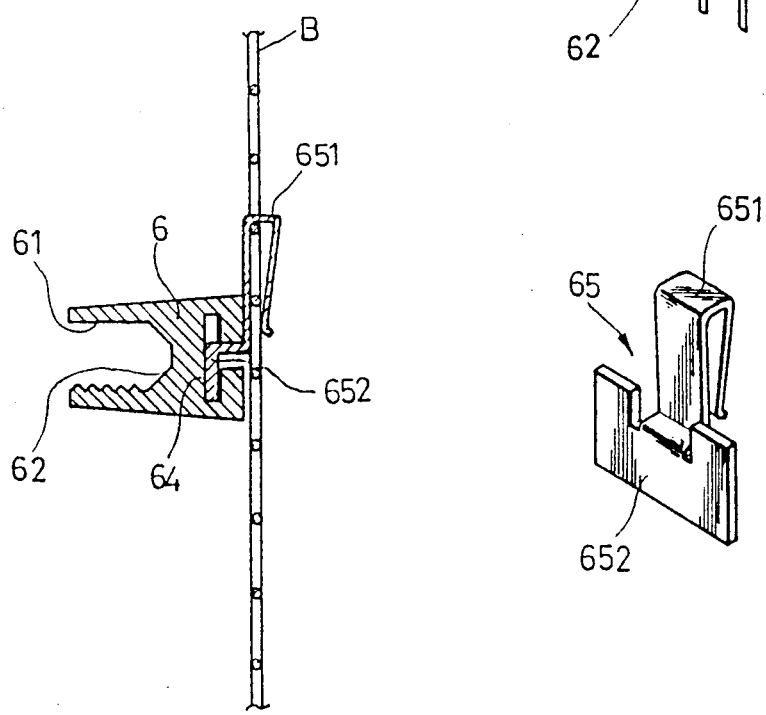
Figures 3, 11:
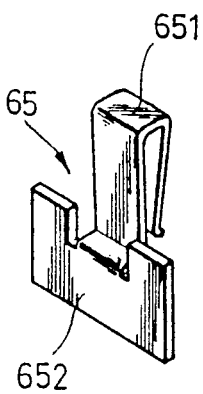

In addition, such devices as drawers and baskets may be installed between the combined frames as shown in FIG. 10, a slide rail(6) may be installed in the symmetrical positions on the partition plates(32) of tube(1) respectively, making use of the guide of V-shaped groove(62) at the center of bottom edge of guide way(61) of said slide rail (6) can easily fix the slide rail(6) on the partition plate (32) by means of nail(63), then such articles as drawer (D) with convex rail can be inserted by means of guide way(61), and the said slide rail(6) may be also used for installing on the wire netting(B) through the T-shaped groove (64) on the back of said slide rail(6)

in keeping with a snap-hook(65) on which may be hung onto the grid of wire netting(B); since the width of both hook(651) and grid is the same, the slide rail(6) can be stably installed on the wire netting(B); the snap(652) is in keeping with the T-shaped groove(64), so the slide rail(6) also can be installed on the wire netting(B) for installing such articles as drawer(D) with convex rail, as shown in FIG. 11.

Figure 12:
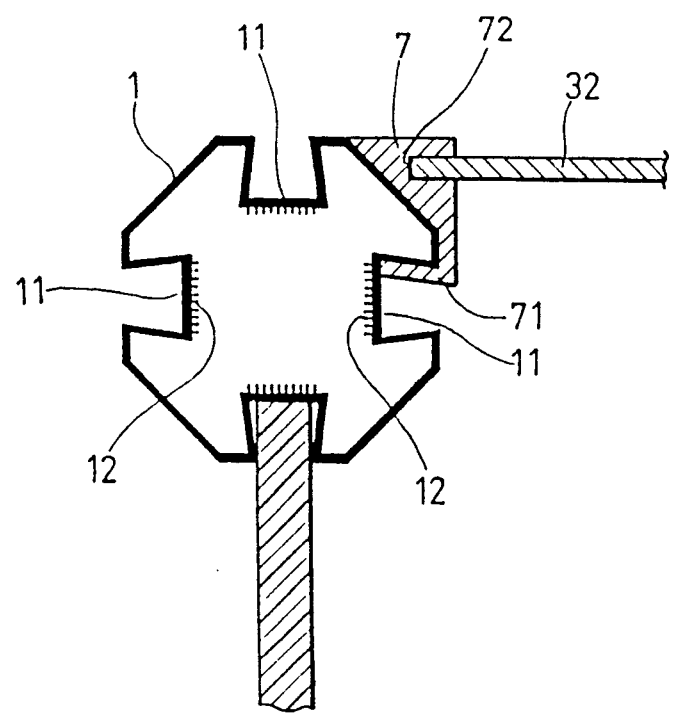
FIG. 12 is a view of frame members according to another embodiment of the present invention.

The partition plate(32) of frame portion may be inserted in an inserting groove(72) on the outer edge of adjacent dovetail slot(11) through a connecting seat(7) with a hook(71). In keeping with the hook snap on, the lateral edge of said dovetail slot(11) as shown in FIG. 12, the partition plate(32) is inserted in the said groove(72) so as to change the appearance of the frame case and to achieve the purpose of greater changeability of the combination.

Figures 1, 13:
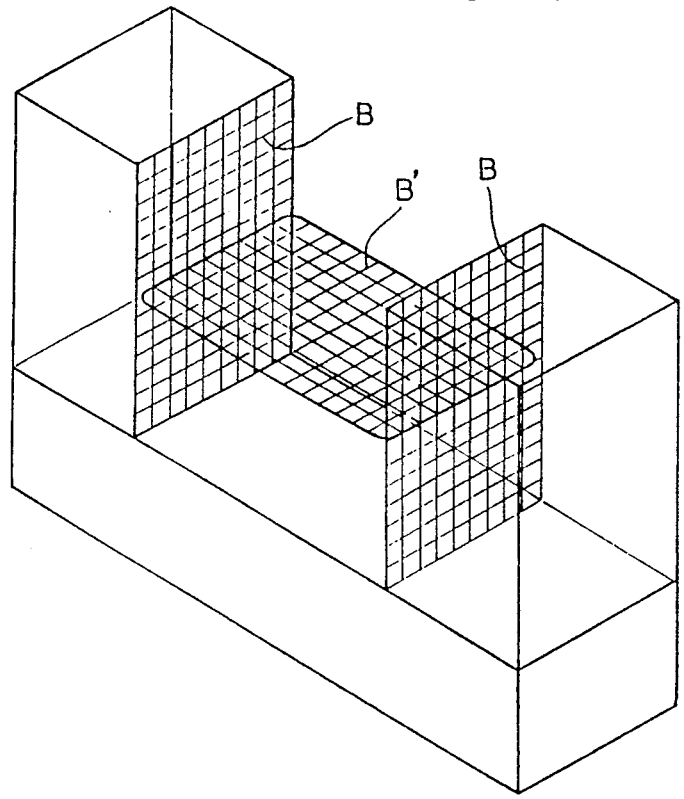
Figures 2, 13:
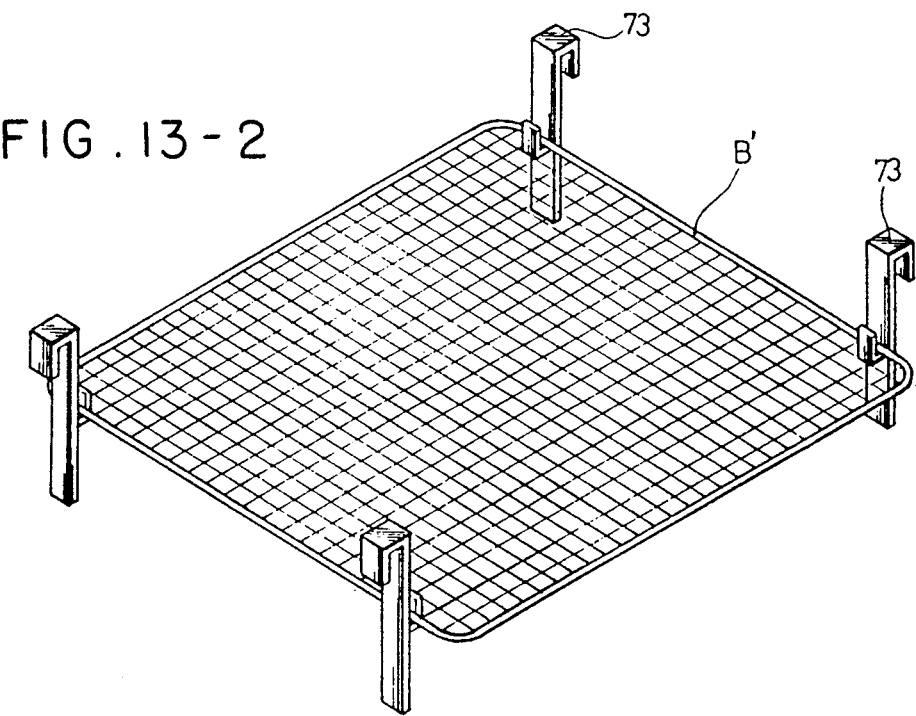
Figures 1, 14:
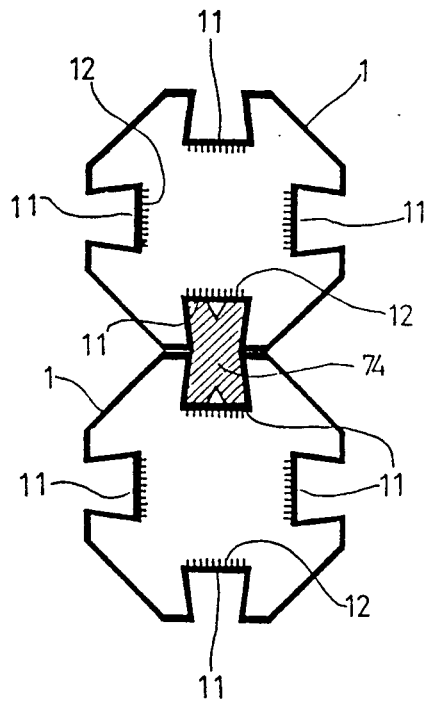
Figures 2, 14:
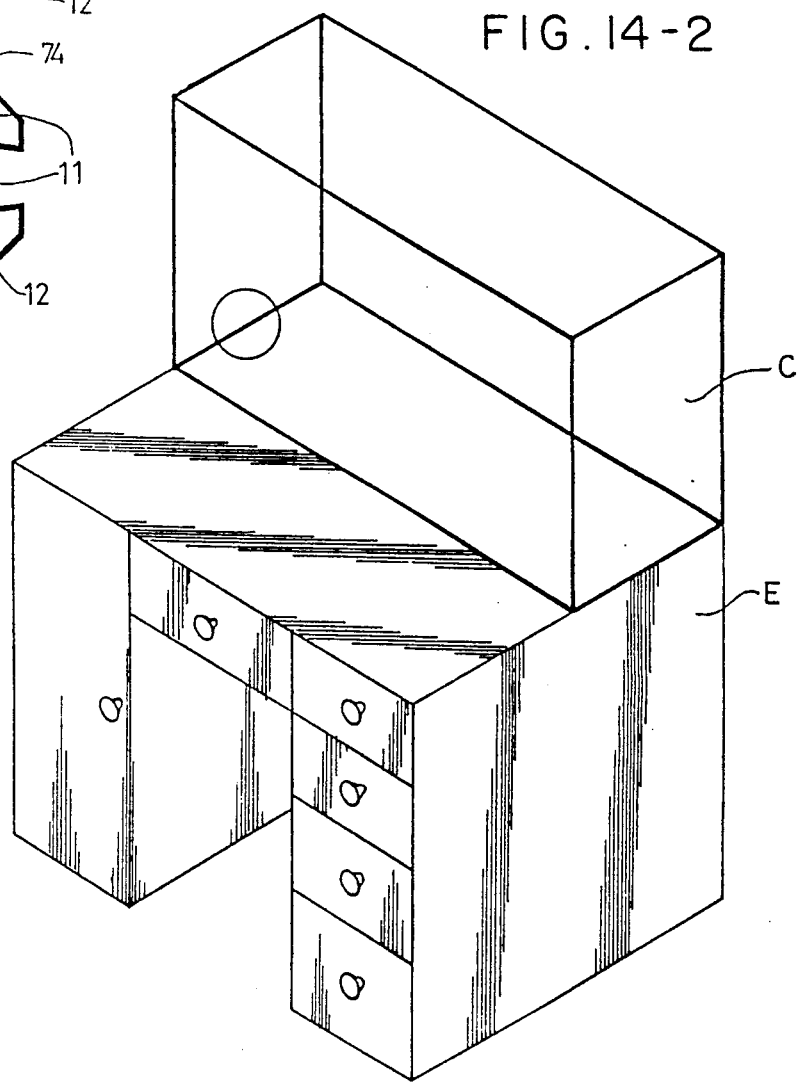

In addition, the accessory of hanging hook(73) as shown in FIG. 13 may be used to hang other wire netting (B) conveniently on the wire netting(B) of frame. As shown in FIG. 14, the section of another connector(74) is in a state of two dovetails engaged with each other so as to directly combine other frame case(C) with the cabinet (E) without replacing materials for arrangement anew, the said connector(74) may be directly disposed between the tubes(1) engaged with said cabinet(E) and case(C) and inserted in the opposite dovetail slots(11) to keep the stable combination of said cabinet(E) and case(C), it is quite convenient and effective.

Figures 1, 15:
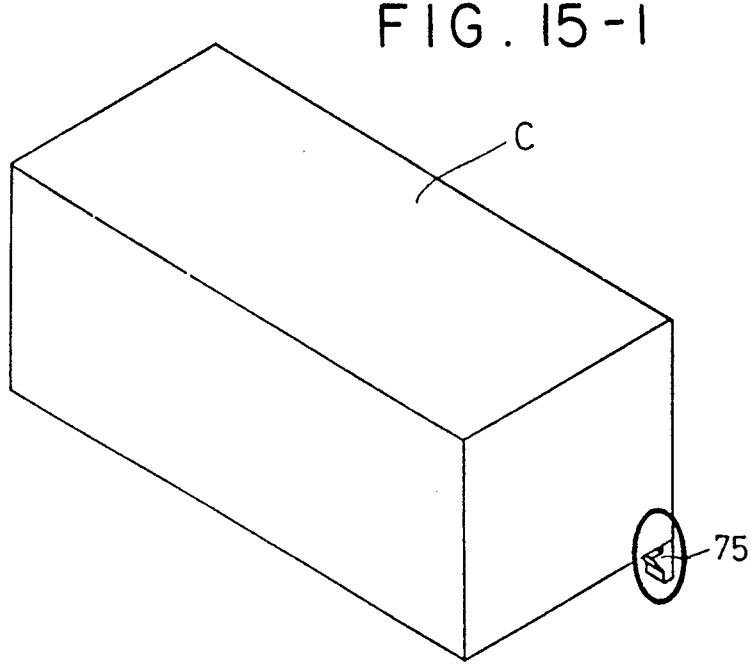
Figures 2, 15:
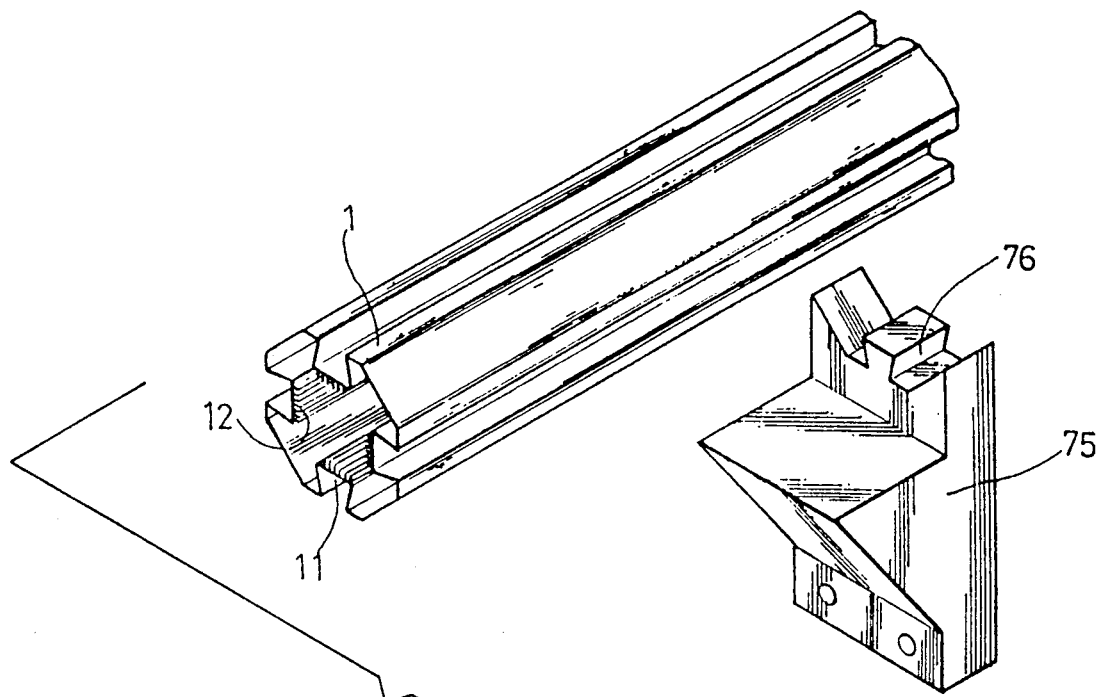

As shown in FIG. 15, a connecting seat(76) in keeping with the shape of outer edge of tube(1) is provided to the surface of a wall fixing seat(75), including a forked seat with four corners and a reverse convex dovetail member. After insertion in the tube(1) at the bottom edge of said case(C), the wall fixing seat(75) is installed on the wall to support the case(C) and to make it more stable, and the frame tube(1) against the wall may very conveniently be fixed with nails.

Figure 16:
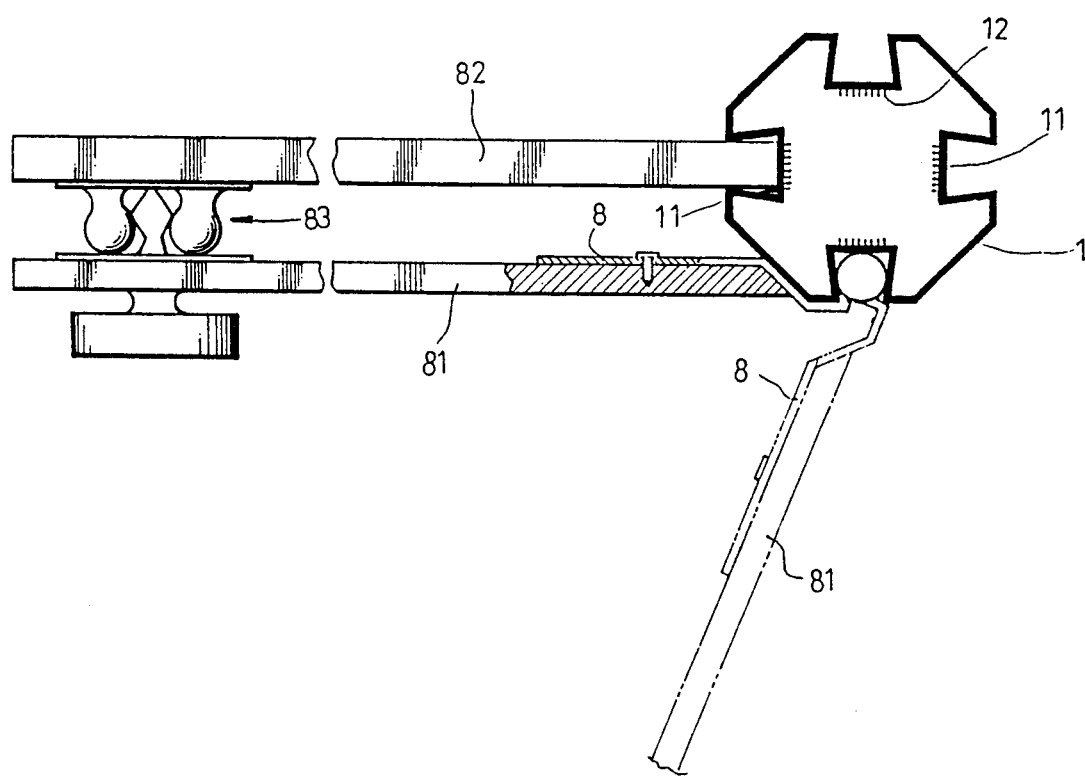
FIG. 16 is a view of frame members of the present invention for installing a door panel and a door stop device.

A hasp hinge(8) with a shape of convex granules in the section of one end thereof (namely, the end is cylindrical) may also be inserted in the dovetail slot (11) of tube(1) to connect a door panel(81) as shown in FIG. 16, and a door stop device(83) may be installed in the position of the back of door panel to conveniently complete the door panel installation of frame cabinet.

Figures 1, 17:
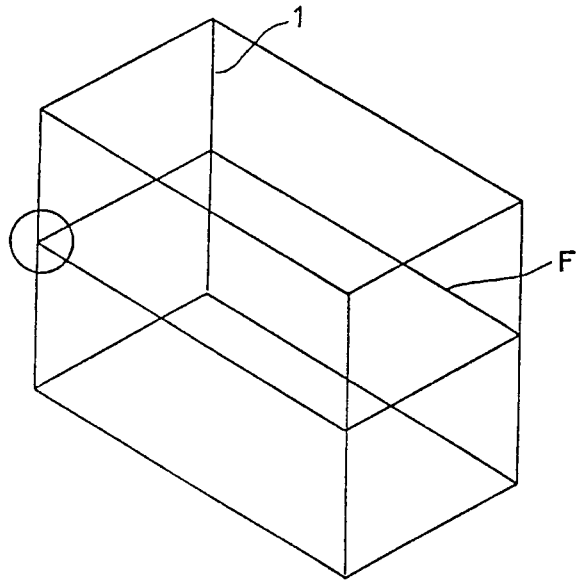
Figures 2, 17:
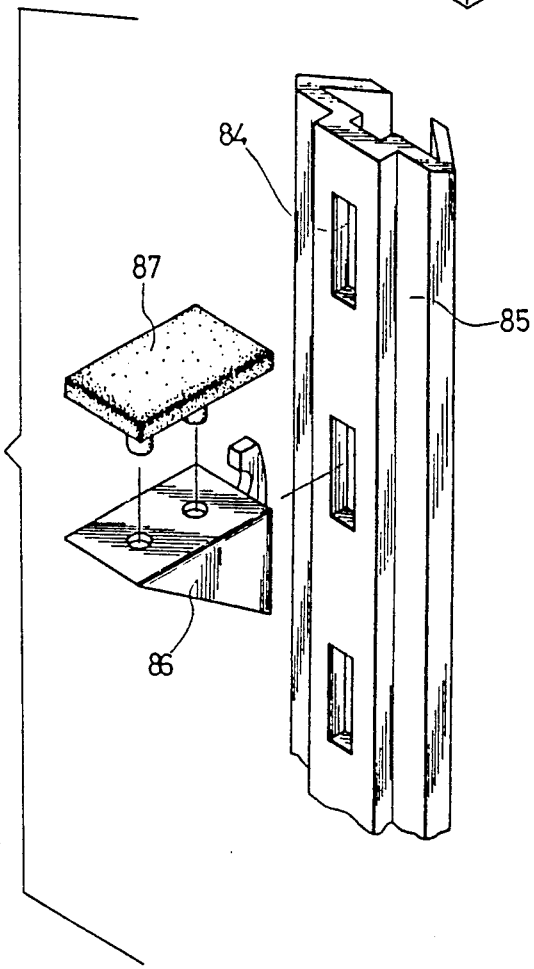
Figures 3, 17:
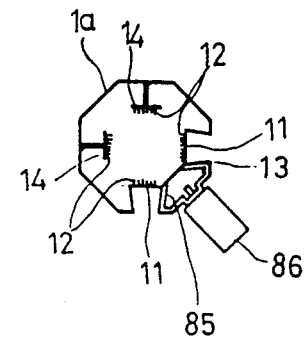

As shown in FIG. 17, when installing additional partition materials(F) in the frame, a post(85) with the same shape of inserting groove(13) and with snap holes (84) is inserted in the inserting groove(13) on the inner side of frame through the tube(1), and a support seat(86) may be snapped by means of said snap holes(84), and a receiving pad(87) may be inserted onto the said seat(86) so as to directly install the partition materials(F) such as glass and partition plate in the frame quite conveniently.

In view of the foregoing examples, one can combine the furniture and appliances as one like in line with the frame portion and connector portion of the present invention in keeping with some accessory members, without necessary manufacturing by professional technicians. One can make self-designed furniture and appliances very practicable.

In view of the above, the basic configuration of the "structure of multi-function frame members" of the present invention is really novel and creative and may be easily combined into the furniture and appliances of various types as required by oneself through some special accessory members to display a plurality of functions thereof, which is an invention with practical value.

I claim:

1. A structure of multi-function frame members comprising a frame portion and a connector portion, wherein the frame portion comprises an octagonal tube having two or more outer sides each provided with a longitudinally extending dove-tailed slot therein and having two pairs of mutually opposed longitudinal engaging surfaces extending along the inside of the tube and each engaging surface being provided with a plurality of longitudinal projections extending along the length of the tube; and wherein the connector portion comprises a support member having two or more sides each provided with a leg extending perpendicularly therefrom, the leg being provided with transverse projections thereon and engaging with the engaging surfaces of the tube, with the projections on the engaging surfaces of the tube and the projections on the legs being mutually perpendicular.

2. The structure according to claim 1, wherein the one pair of engaging surfaces of the tube is at right angles to the other pair.

3. The structure according to claim 1, wherein said slotted sides are four in number and are arranged in two mutually opposed pairs and the slots in one pair of sides being perpendicular to the slots in the other pair of sides.

4. The structure according to claim 3, wherein each slot has a base portion which is adjacent one of said engaging surfaces.

5. The structure according to claim 1 which includes at least one suspension hook for attachment to the tube.

6. The structure according to claim 1 which includes a rail insertable in the dovetail slot, said rail having a recess for receiving a door panel.

7. The structure according to claim 1 which includes a partition plate with an elongate projection to fit in the dovetail slot, and means securing a snap hook to the partition plate.

8. The structure according to claim 1 which includes a hook for engaging over the tube, the hook having one limb for engaging in the dovetail slot and a recess for receiving a partition plate.

9. The structure according to claim 1 which includes a connector having a first portion shaped to fit in the dovetail slot and a second projecting portion shaped to fit in a like dovetail slot of an adjacent tubular member.

10. The structure according to claim 1 including a wall-fixing connector having a central projection for fitting in the dovetail slot, and recessed portions on opposite sides of said projection for embracing the tube.

11. The structure according to claim 1 including a hinge element adapted to fit in the dovetail slot and a hinge plate on said element for receiving a door panel.

12. The structure according to claim 1 including a post for embracing a portion of the tube between a pair of adjacent dovetail slots, the post having limbs adapted to fit in the respective dovetail slots, the post having at least one seat formed therein for receiving a support element.

* * * * *